Aug. 28, 1923.
A. SCHUSTER
ATTACHMENT FOR BARBER SHEARS
Filed May 7, 1921
1,466,193
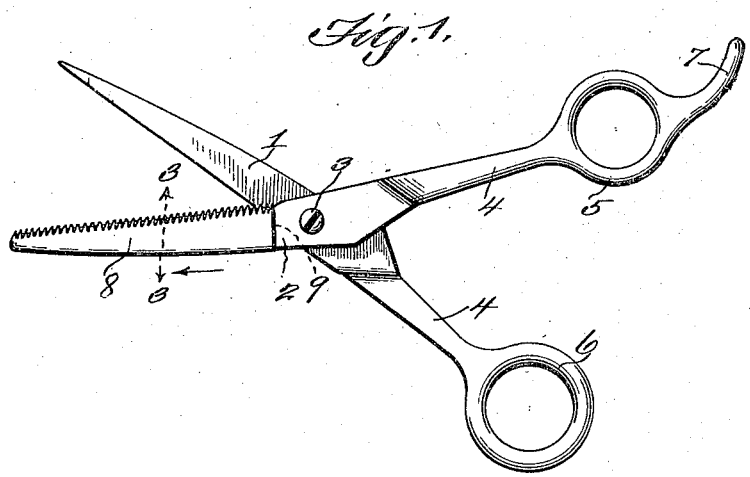
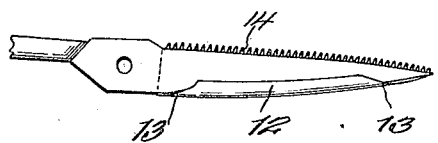
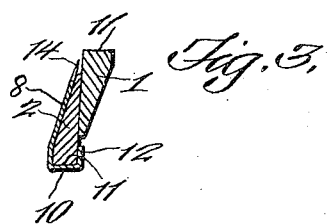
Inventor
Anton Schuster,
By Watson E. Coleman
Attorney Patented Aug. 28, 1923.

1,466,193

UNITED STATES PATENT OFFICE.

ANTON SCHUSTER, OF ST. LOUIS, MISSOURI.

ATTACHMENT FOR BARBER SHEARS.

Application filed May 7, 1921. Serial No. 467,715.

*To all whom it may concern:*

Be it known that I, ANTON SCHUSTER, a citizen of the United States, residing at St. Louis and State of Missouri, have invented certain new and useful Improvements in Attachments for Barber Shears, of which the following is a specification, reference being had to the accompanying drawings.

Considerable trouble and inconvenience has been experienced in hair cutting, owing to the hair bunching between the cutting edges of the shears, and very often sliding a short distance along the cutting edges, when the blades are moved toward each other, and this is particularly true when the cutting edges become dull.

Therefore it is the purpose of the present invention to provide an attachment preferably carried by the top or outer shear blade and provided with teeth to not only prevent slipping of the hair, but also to hold the hair uniformly, in fact even throughout the length of the cutting edge of the blade. The teeth are formed on the attachment, so as to project a slight distance over the cutting edge, in order to be engaged by the hair, and yet not to interfere with the cutting action.

Devices of this kind have been heretofore used, but they are more or less complicated, particularly in the construction of the means, which holds the attachment to the blade. For instance in the devices which have been used alterations or changes have been made in the construction of the shear blade, such as forming holes to receive screws, in order to hold the attachment in position. It can be readily understood that the formation of holes in the shear blade weakens the blade, and at the same time makes the attachment complicated, and more difficult to remove when it is desired to sharpen the cutting edge of the blade. When sharpening the edge of the blade, the blade naturally becomes heated owing to the friction of the blade on the sharpening member, which results in warping the blade, and more so if the blade is weakened, by the formation of slots, screw holes or grooves in the blade. When the blade is again used, it is necessary to remove the warp, in fact reset the blade, this is done by hammering the warped blade with the sharpened edge of the specially constructed hammer. This work requires skill ordinarily, and in cases where the blade has grooves, slots, or openings, the blade warps considerably, therefore after sharpening a blade of this kind, it entails extraordinary skill to reset the blade, in fact to remove the warp.

The purpose of setting forth of the above conditions, is to point out why a very simple attachment of the present kind is deemed advantageous from a device of a complicated construction and for the same purpose.

For instance the present attachment comprises a relatively rigid piece of sheet metal, preferably steel, conforming to and fitting upon the outer or upper cutting shear blade, the same being held in place by friction, and without any slots, screw holes, grooves or the like. It is well known that a shear blade adjacent the back edge is relatively thick, and of a substantial uniform thickness throughout the length of the blade, the blade being tapered in cross section, so therefore should an attachment, as in the present case be afforded to conform to the shape of the blade in cross section, it may be held upon the blade frictionally.

An attachment of this extremely simple character is particularly advantageous over the heretofore complicated constructions, and when the attachment is removed for the purpose of sharpening the blade, the usual or ordinary skill may be exercised when resetting or removing the warp from the blade, hence the necessity of avoiding the use of grooves, slots, screws or other complicated means for retaining an attachment of this character on a shear blade.

A further purpose embodies the provision of a sheet metal attachment, which fits the outer face of the blade, conforming thereto, and has on one edge a flange overlying the inner surface of the blade, the body of the sheet metal attachment being disposed at an acute angle to the flange, in order to conform to the blade, and retain the attachment in position. The other edge of the sheet metal attachment is provided with teeth, which overlie the cutting edge, and act to engage between the hairs, space them, hold them uniformly, and at the same time preventing them from slipping as the cutting edges move toward each other.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of a pair of barber shears, showing the outer or top blade thereof equipped with the sheet metal attachment, for holding the hairs uniformly.

Figure 2 is a plan view of a portion of the outer or upper cutting blade, showing the inner face thereof, and illustrating the attachment applied.

Figure 3 is a sectional view on line 3—3 of Figure 1, but illustrating the other blade in close position relatively to the outer or top blade.

Referring to the drawings, 1 and 2 designate the cutting blades of a pair of barber shears, said blades being pivoted together by means of the usual screw 3, and are provided with shanks 4, which terminate in finger engaging grips 5 and 6. The finger engaging grip or eye 5 has a finger piece 7 projecting therefrom, which may be engaged by the fingers of the hand, when operating the shear blades.

As a rule the outer or upper blade 2 is operated to a greater degree than the other blade, owing to the fact that practically all the fingers of the hand engage with the shank of this blade, therefore resulting in constant movement of the finger engaged shank in a direction toward the thumb engaged shank.

The attachment comprises a body plate 8 of sheet metal preferably steel, and which is tapered as shown conforming to the blade. The body of the attachment rises adjacent the outer inclined face 9 of the blade 2. One edge of the sheet metal body has a flange 10, which conforms to and engages the back edge 11 of the blade 2, and this flange 10 terminates in an additional flange 12, which is in parallelism with a part of the sheet metal body. The flange 12 is disposed at right angles to the flange 10, and lies adjacent to and engages the inner face of the blade 2. Owing to this arrangement, the flange 12 extends at an acute angle to the body plate 8, which results in a cooperation between the body plate and the flange 12, to hold the sheet metal body in position on the blade. This flange 12 adjacent its opposite end gradually merges into the sheet metal body, as indicated at 13 (Figure 2). The adjacent inner faces of the blades of the shears do not engage throughout their entirety. In fact portions of the adjacent faces of the blades never engage, that is such portions which are immediately adjacent the back edges 11 of the blades, hence permitting of the overlying position of the flange 12.

The other edge of the sheet metal body is provided with a plurality of relatively long teeth 14, which are neither too short, or too long, for it should be borne in mind that these teeth are of sufficient length to overlie the cutting edges of one or the other of said blades, preferably the outer or top blade, so that when operating the shear blade, the hair will become evenly distributed along the cutting edge, uniformly, and at the same time preventing slipping of the hair. As shown in Figure 3 the elongated teeth 14 do not in any way interfere with the cutting action of the cutting edge of the shear blade. The cutting edges of both blades, when in action, move toward and from each other, and since the teeth are so disposed, the hair is held uniformly and evenly distributed, which will result in facilitating the cutting of hair.

It will be noted that the portion of the shear blade nearest the pivot 3 is substantially of uniform width for a short distance from the pivot. In fact the opposite edges of said blade for a distance are substantially in parallelism, thereby lessening the chances of the attachment sliding off the blade, due to the taper of the sheet metal body.

The invention having been set forth, what is claimed as being useful is:

As an article of manufacture, an attachment adapted to be used in connection with shear blades, comprising a sheet metal body adapted to lie against the outer inclined face of a shear blade, one edge of the body having relatively long sharp teeth overlying and extending in advance of the cutting edge of the shear blade and aligned with said sheet metal body, the other edge of the body terminating in a flange rectangular in cross section having all of its sides engaging flatly against the three faces of the back edge of the shear blade which is rectangular in cross section, a portion of said flange disposed against the inner face of the shear blade, and extending at an acute angle to the body of the plate, thereby acting to retain the sheet metal body on the plate.

In testimony whereof I hereunto affix my signature.

ANTON SCHUSTER.